Jan. 31, 1967  J. W. KISLING III, ETAL  3,301,063
PRESSURE RECORDER
Filed Dec. 10, 1964
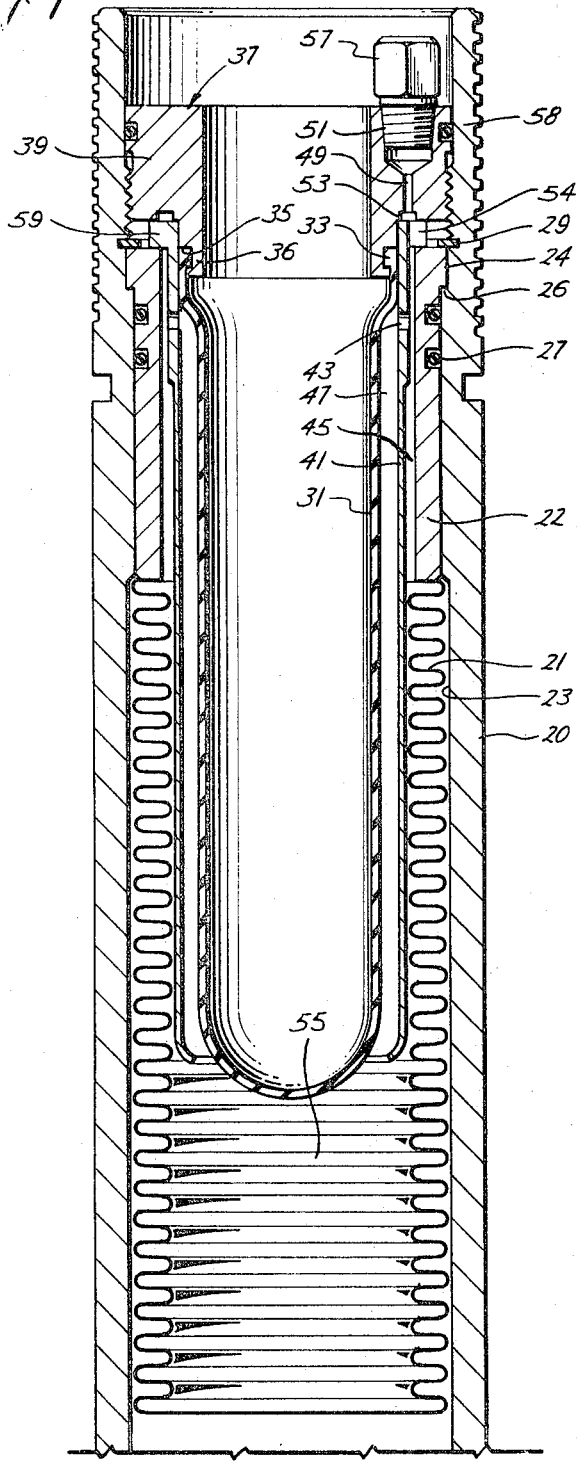
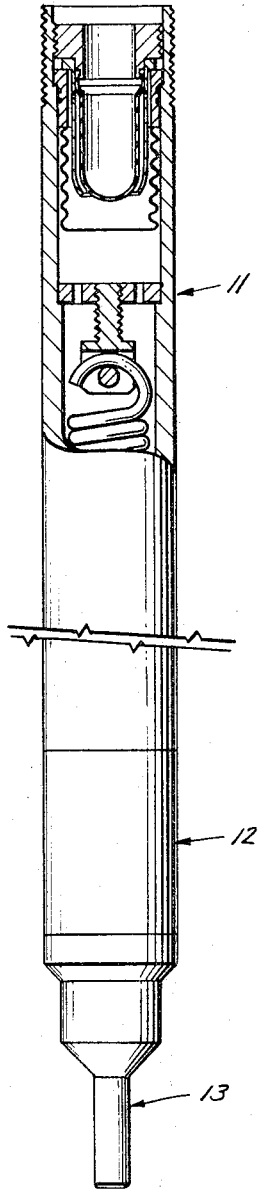
James W. Kisling, III
John E. Stachowiak
INVENTORS
BY John E. Holder
ATTORNEY

3,301,063
PRESSURE RECORDER

James W. Kisling III and John E. Stachowiak, Houston, Tex., assignors to Schlumberger Well Surveying Corporation, Houston, Tex., a corporation of Texas
Filed Dec. 10, 1964, Ser. No. 417,284
3 Claims. (Cl. 73—395)

This application relates to a pressure recorder and, more particularly, to a pressure recorder for use within a well bore.

In the testing of oil wells, it is desirable to record pressures developed in the well bore during the various phases of the testing operation. The information from these pressure recordings is translated into factors which are indicative of the conditions in the formation and reservoir. Thus, the information provides the means for efficiently and economically developing a well. It is readily seen that the accuracy of such pressure recordings is important in that it is determinative of unknown factors relating to the well conditions. Additionally, the testing of a well is a time consuming and expensive operation; therefore, the reliability of the recorder is an important factor to consider in its construction. At the same time, the requirements of reliability and accuracy dictate that parts of the recorder mechanism must be protected from the adverse effects of exposure to well fluids and gases.

It is, therefore, an object of this invention to provide a new and improved pressure recorder system for repeated use under well bore conditions wherein reliability and integrity of the measuring functions is maintained.

It is a further object of the present invention to provide an improved apparatus in a pressure recorder for transmitting the borehole pressures to a recording mechanism.

It is still another object of the present invention to provide a new and improved pressure recorder which includes means for transmitting well bore pressures to a recording mechanism without subjecting the mechanism or transmitting means to any adverse effects of gas and fluids within the well bore.

With these and other objects in view, the present invention contemplates a pressure recording apparatus which is constructed to provide accurate pressure recording in a well bore. More particularly, the apparatus includes a housing within which is positioned a mechanism and chart for making permanent recordations of pressure changes encountered in the well bore over a period of time. A bellows and diaphragm mechanism is provided in the top of the housing to permit pressure fluctuations in the well bore to be transmitted to the recording mechanism without introducing well fluids or gas into the recording mechanism. Means are also provided to permit the escape of gas which may permeate the diaphragm and become entrapped between the diaphragm and bellows.

A complete understanding of this invention may be had by reference to the following detailed description when read in conjunction with the accompanying drawings illustrating an embodiment thereof, wherein:

FIG. 1 is an elevational view in partial section of a pressure recorder embodying the principles of the present invention; and FIG. 2 is a detailed cross sectional view of the diaphragm and bellows arrangement in a pressure sensing section of the recorder.

Referring first to FIG. 1, a schematic representation of the recorder shows an upper section 11 which houses the pressure sensing mehcanism of the recorder. FIG. 1 shows this upper section partially cut away to expose a unique diaphragm and bellows assembly in the upper end of the section. An intermediate section 12 of the recorder contains a recording chart, stylus and clock apparatus for making records of well pressures versus time. A lower section 13 contains a thermometer for measuring the temperature of the well. The details of a suitable recording mechanism comprising the upper, intermediate and lower sections of the present recorder (other than the diaphragm and bellows assembly) may be obtained by referring to U.S. Patent No. 2,816,440 which describes a tension-spring type recorder.

Referring now to FIG. 2, the upper end of the pressure sensing section of the recorder housing is shown in detail. This detailed portion shows in particular a bellows an diaphragm assembly which comprises, a bellows 21 shown supported in a housing 20 by a bellows retainer 22, the bellows and retainer forming a bellows assembly. The bellows are preferably made of a thin metal and have corrugated side walls which permit extension and retraction of the bellows within a bore 23 of the housing. The bellows retainer has an enlarged annular shoulder 24 extending radially outwardly from it upper end. The shoulder portion 24 seats on a complementary shaped annular shoulder 26 formed within the housing bore 23. The bellows 21 is soldered to the bellows retainer 22 at the lower end of the retainer. O-ring seals 27 are positioned in grooves formed on the outer peripheral surface of the bellows retainer and form a seal between the retainer and the housing. A snap type retainer ring 29 is positioned in an annular recess formed in the bore of the housing above the bellows retainer 22 to hold the shoulder 24 formed on the bellows retainer against the shoulder 26 in the bore of the housing.

A diaphragm 31 made of a flexible material such as neoprene is shown positioned in the housing within the interior of the bellows assembly. The upper end of the diaphragm 31 has an inwardly facing seal portion 33 formed thereon. The seal portion 33 is sized for being received within a groove 35 provided on a downwardly extending flange 36 projecting from a diaphragm retainer 37. The upper end of the retainer 37 forms an enlarged portion 39 which is threadedly received in the upper end of the recorder housing bore. O-ring 58 is positioned on the portion 39 to form a seal between the retainer 37 and housing bore.

A tubular metal sleeve 41 is positioned over the diaphragm and pressed onto the flange 36 depending from the retainer 37. This pressing of the tube or sleeve 41 on the flange 36 compresses the seal portion 33 of the diaphragm into the groove 35 in the diaphragm retainer. Tube 41 has a flange 59 at its upper end which flange rests on the upper end of the bellows retainer shoulder 24. The tube 41 extends lengthwise about the diaphragm 31 to form a barrier between the diaphragm and the bellows. This barrier between the diaphragm and bellows prevents the diaphragm from being pinched by the contraction of the bellows, particularly when the diaphragm is in a collapsed or folded condition. The arrangement of the tube 41 forms an annular space 45 between the tube and the bellows 21 and another annular space 47 between the tube and the diaphragm 31. A series of holes 43 through the wall of the tube 41 provide for fluid communication between the annular spaces 45 and 47.

A passageway 49 extends longitudinally through the diaphragm retainer. This passageway has an enlarged threaded portion 51 at its upper end. The lower end of the passageway 49 connects with a circular recess 53 formed on the bottom surface of the enlarged shoulder portion 39 of the diaphragm retainer. Longitudinal slots 54 are formed in the flange 59 on tube 41 to place the recess 53 and passageway 49 in fluid communciation with the annular spaces 45 and 47 and a chamber 55 formed between the diaphragm and bellows. A poppet type pressure relief valve 57 is positioned in the enlarged threaded portion 51 of the passageway. The valve 57 permits pressures developed above a certain level within the annular spaces 45, 47 and chamber 55 to escape to the exterior of the tool through the relief valve.

The operation of the pressure recorder is as follows. The recorder is lowered in the well bore normally in conjunction with formation testing equipment (not shown). A selected section of formation in the well is isolated and the interior of the tool string is opened to the selected formation to let any fluids therein flow into the tester and thereby produce fluids from the selected formation. The upper end of the recorder housing as shown in FIGS. 1 and 2 may be attached to a section of perforated pipe to permit exposure of the recorder to formation fluids so that pressures which are encountered in the well bore during the testing operation are in communication with the recorder. The interior of the sensing section 11 of the recorder, the space between the bellows and the sensing mechanism, and the space between the diaphragm and bellows are all filled with a suitable fluid such as mineral oil. This mineral oil is initially at atmospheric temperature and pressure when the recorder is lowered into the well bore.

As the recorder is lowered into the well, the temperature and pressure in the well bore normally increase with depth. The length of the bellows 21 changes to accommodate the net or resulting growth or decrease in oil volume in the chamber 55. This change in volume is due to the combined effects of the temperature and pressure changes in the mineral oil in section 11 of the recorder. Due to the change in the length of the bellows, the diaphragm 31 collapses or expands depending upon whether the bellows contracts or expands. Upon reaching a selected depth in the well bore, the lowering of the recorder ceases thereby stabilizing the pressure within the recorder. The temperature within the recorder also stabilizes after a period of time. The diaphragm and bellows assembly is constructed so that under normal pressure and temperature conditions encountered in a well bore at a recording depth, the diaphragm will be in a partially collapsed condition. Thereafter, with the opening of the formation testing tool to the flow of formation fluids, there is an immediate drop in pressure in the well bore, the testing tool normally being open to atmospheric pressure. This reduction in pressure is transmitted to the sensing section of the recorder through the diaphragm and bellows. As the formation begins to flow, the pressure in the well bore will begin to increase in which event such pressure will cause the now collapsed diaphragm to expand thereby displacing fluid within the space between the diaphragm and bellows causing the bellows to expand which, in turn, displaces fluid in the sensing section below the bellows thus transmitting the increase in pressure from the well bore to the sensing section of the recorder housing. This increase in pressure within the sensing section of the recorder is changed to a representative mechanical motion in the recorder mechanism, which mechanism mechanically charts the changes in pressure developed in the well bore versus time.

As is often the case, fluids in the formation being tested contain gas. This gas, when under pressure, tends to permeate the neoprene diaphragm and thereby become trapped in the chamber 55 between the diaphragm and bellows and likewise in the space 47 between the diaphragm and diaphragm tube. However, the chamber 55 and the space 47 are in communication with the passageway 49 extending through the diaphragm retainer. Therefore, such trapped gases are permitted to escape through the poppet type pressure relief valve 57 in the diaphragm retainer. This release of pressure prevents the gases, which would otherwise be under pressure, from expanding upon retrieval of the recorder to the surface, which expansion would tend to rupture the diaphragm.

It is seen that by positioning a diaphragm between the well fluid and the bellows, drilling muds and other particulate matter found in the well bore are prevented from lodging in the corrugations formed in the bellows. Such foreign matter would prevent the bellows from extending and contracting in an accurate relationship with the changes in pressure in the well bore.

The bellows on the other hand prevent high pressure gas that may permeate the diaphragm from entering the recorder. Such gases may contain elements which are corrosive to the metallic parts in the recorder. The bellows also form a secondary barrier in the event that the diaphragm fails or ruptures to prevent well fluids from entering that portion of the recorder which houses the tension spring and a pressure-sensing piston. The metal tube between the diaphragm and the bellows prevents the diaphragm from engaging the bellows thereby protecting the accuracy of the bellows expansion and also preventing the bellows from pinching the diaphragm.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. In a pressure-measuring apparatus for use in a well bore where the apparatus includes a housing, means within the housing which are responsive to changes of pressure for providing indications of pressures encountered in the well bore, and means providing access for well fluids to the housing to affect said pressure-responsive means, the improvement comprising: metal bellows means hermetically sealing off the interior of said housing from gas contained in well fluids and permitting the interior of said housing to be filled with a pressure-transmitting fluid; elastomer means sealing off said bellows means from access to well fluids and forming a space for receiving a pressure-transmitting fluid; and pressure relief valve means in communication with the space between said bellows and elastomer means, said bellows means and elastomer means permitting pressure in the well bore to be sensed within said housing without exposing the interior of said housing to gas or fluid found in a well.

2. In a pressure-measuring apparatus for use in a well bore; a housing adapted for being positioned in a well bore; means responsive to changes of pressure and positioned within the housing for providing indications of pressures encountered in the well bore; said housing having an opening therein providing an access for well fluids in the well bore to affect said pressure-responsive means; means impermeable to gas in the well bore and movable in response to pressure changes, said impermeable means being positioned in said housing between said opening and said pressure-responsive means and spaced from said pressure-responsive means to form a first chamber for receiving a pressure-transmitting fluid; means permeable to gas under pressure and movable in response to pressure changes, said permeable means being positioned in said housing between said opening and said impermeable means and spaced from said impermeable means to form a second chamber for receiving a pressure-transmitting fluid; and pressure relief valve means in communication with said second chamber.

3. In a pressure-measuring apparatus for use in a well bore where the apparatus includes a housing, means within the housing which are responsive to changes of pressure for providing indications of pressures encountered in the well bore, and means providing access for well fluids to the housing to affect said pressure-responsive means, the improvement comprising: a bellows hermetically sealing off the interior of said housing from gas contained in well fluids and thereby forming a chamber in the interior of said housing to be filled with a pressure-transmitting fluid; a diaphragm sealing off said bellows means from access to well fluids and forming a space between said diaphragm and bellows for diaphragm and bellows for receiving a pressure-transmitting fluid; a member positioned between said bellows and diaphragm to prevent said diaphragm from contacting said bellows; and pressure relief valve means in communication with the space between said bellows and diaphragm, said bellows and diaphragm permitting pressure in the well bore to be sensed by said pressure-responsive means within said housing without exposing the interior of said housing to gas or fluid found in a well.

References Cited by the Examiner
UNITED STATES PATENTS 2,816,440   12/1957   Garrison _____ 73—151
3,177,707   4/1965   Whyte _____ 73—119

LOUIS R. PRINCE, *Primary Examiner.*